Figure 1:
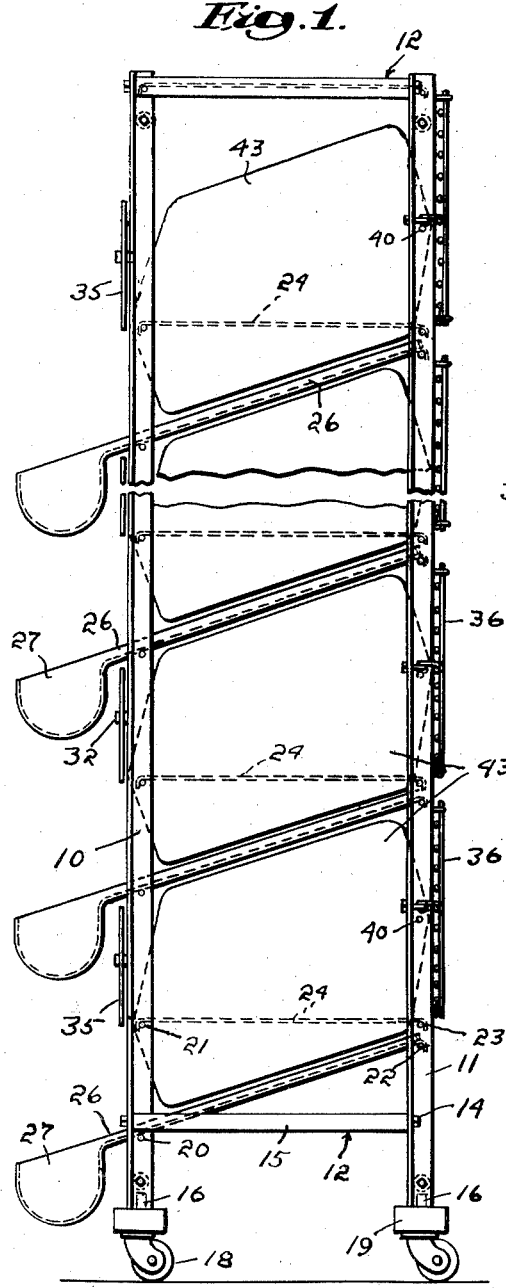

Oct. 28, 1958     W. STONE, JR     2,857,880

ANIMAL CAGES

Filed Oct. 10, 1956     3 Sheets-Sheet 1

Inventor:
William Stone, Jr.
by
Attorney

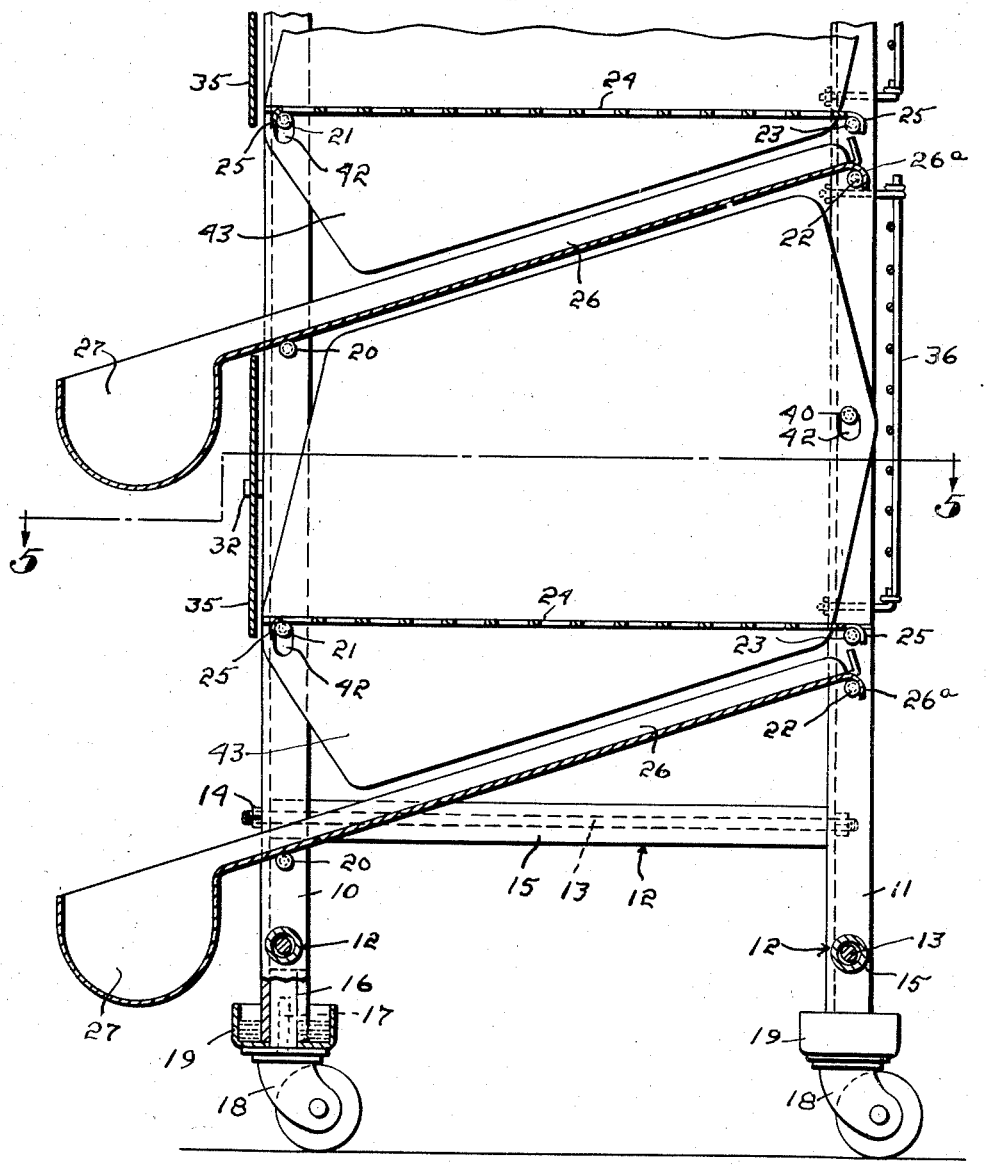

Oct. 28, 1958   W. STONE, JR   2,857,880
ANIMAL CAGES
Filed Oct. 10, 1956   3 Sheets-Sheet 3
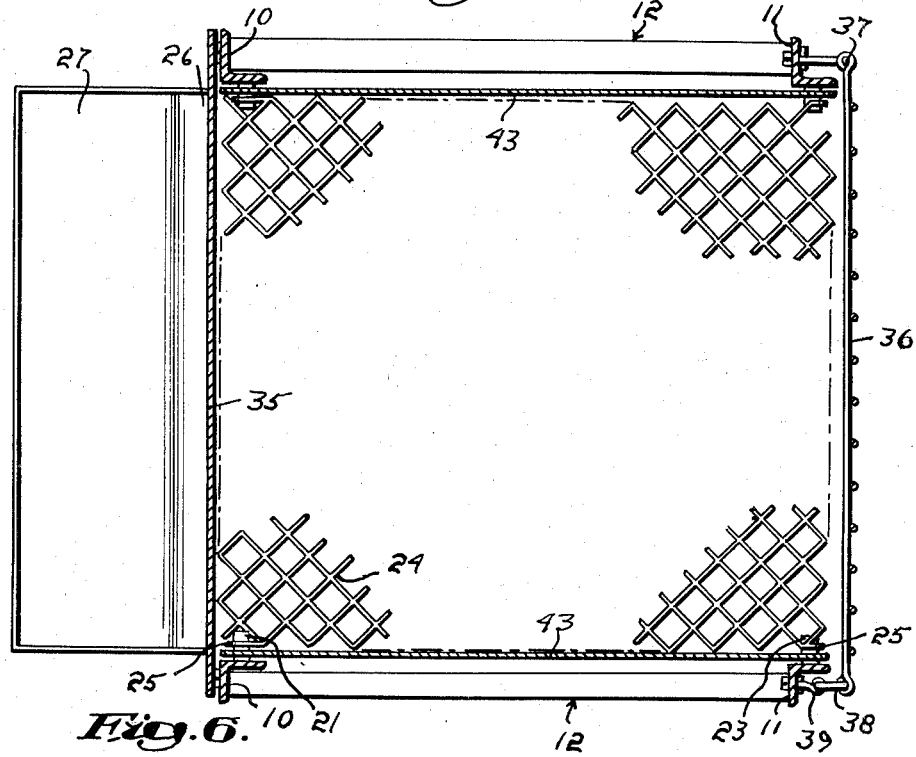
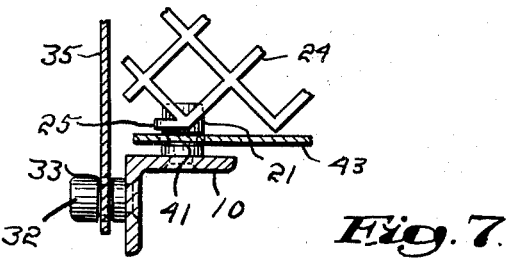
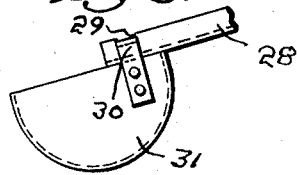
Inventor:
William Stone, Jr.
by Albert Spear
Attorney

United States Patent Office 2,857,880
Patented Oct. 28, 1958

2,857,880

ANIMAL CAGES

William Stone, Jr., Boston, Mass.

Application October 10, 1956, Serial No. 615,059

4 Claims. (Cl. 119—17)

The present invention relates to animal cages and particularly to such cages having a vertically disposed series of animal receiving chambers.

Animal husbandry, because of various factors of which cost is an important one, does not always permit animals to be housed under conditions enabling sanitation to be effectively practiced. When, as in veterinarian hospitals and in research laboratories, results depend on prevention of the spread of disease, sanitary housing is a more positive requirement, even though available space and initial and maintenance costs may be more limiting factors than in commercial enterprises.

The present invention has, as its principal objective, the provision of animal cages having a vertically disposed series of chambers that may be manufactured at low cost, that may be easily assembled and disassembled, and that are adapted to be cleaned easily and with a substantial reduction in work time, thus to minimize the risk of the spread of disease as well as to maintain the animals under the best possible conditions.

This objective is attained by providing an animal cage having a frame detachably supporting two series of transverse members with the members of one series being alternated with the members of the other series and vertically spaced one from the other. One series of members is perforate and each of them constitutes the floor of a respective one of a vertically arranged series of animal receiving chambers while the other series of members are rearwardly inclined drop trays or chutes underlying each chamber floor and constituting the roof of the next subjacent chamber or other space and including transversely disposed troughs. Each chamber has a door and side and rear walls and these walls are separately and detachably secured to the frame, preferably in spaced relation thereto.

In practice, the walls, roof and floor of each chamber are so supported as to minimize areas where dirt can collect and yet effectively reduce the transference of dust, hair and the like between cages without interference with the ventilation thereof.

In the drawings, there is shown an illustrative embodiment of the invention from which these and other of its objectives, novel features, and advantages will be readily apparent.

Figure 2:
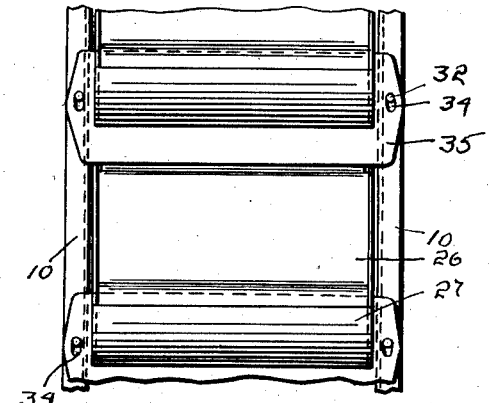
Figure 3:
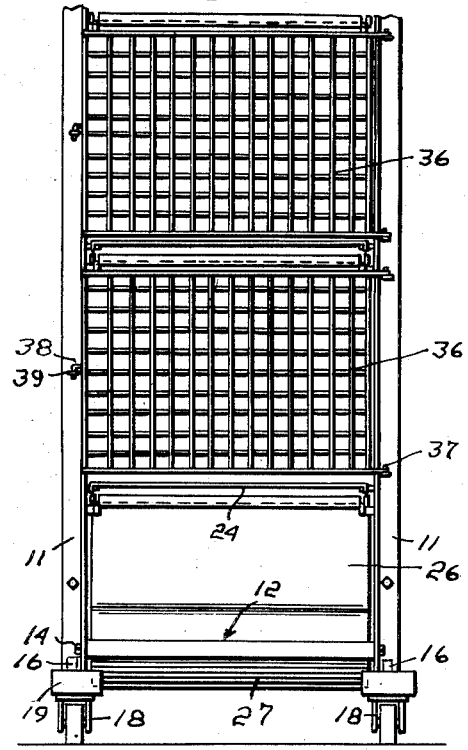

In the drawings:

Fig. 1 is a side fragmentary view of a multicage unit in accordance with the invention, Figs. 2 and 3 are, respectively, fragmentary front and rear views thereof, Fig. 4 is a fragmentary, longitudinally taken vertical section of the lower part of the cage on an increased scale, Fig. 5 is a section, in which certain parts are broken away taken along the indicated lines 5—5 of Fig. 4, Fig. 6 is a fragmentary view of the structure shown in Fig. 5 on a further increased scale, and Figs. 7 and 8 are fragmentary views illustrating a different drop tray and trough arrangement.

In the embodiment of the invention shown in the drawings, there are shown a rear pair of uprights 10 and a front pair of uprights 11. Each upright may conveniently be of stock of right angular section and is connected, top and bottom, to the other upright of that pair and to the proximate upright of the other pair by connecting means generally indicated at 12 to provide a frame that may be quickly and easily assembled or disassembled. The connecting means 12 are shown, in Fig. 4, as comprising rod-like members 13, each threaded at its ends to receive nuts 14 by which two uprights may be clamped against the ends of a tubular spacer 15 through which the member 13 of that connecting means extends.

Each upright, as may best be seen in Fig. 4, is provided at its lower end with a socket member 16 for the pivot pins 17 of a caster unit 18 and an upwardly opening cup or trap 19 surrounding that upright and adapted to receive a suitable insecticide thus to halt the ingress of parasites.

The pair of rear uprights 10 and the pair of front uprights 11 each have two series of vertically spaced pins 20 and 21 and 22 and 23, respectively. The pins of each series are transversely alined and disposed towards each other and corresponding pins of the series 21 and 23 are shown as in the same plane to provide support for the perforate member 24, preferably a screen of flattened and expanded, galvanized metal mesh or equivalent stock having strands bent as at 25 to hook over its supporting pins. Each perforate member 24 defines the floor of an animal receiving chamber.

The pins of the series 22 are located somewhat above the corresponding pins of the series 20 thus to support the side-walled drop pan 26 as a rearwardly and downwardly inclined chute discharging into the transverse trough 27 shown as an integral part thereof in Figs. 1–6 and which may, in use, contain a germicidal deodorant solution. As may be best seen in Fig. 4, each drop pan 26 has at its front end hooks 26a for engagement with appropriate ones of the pins 22. In the embodiment of the invention shown in Figs. 7 and 8, the sides of the drop pan 28 have recesses 29 detachably receiving supporting hooks 30 carried by the trough 31. Each member 26, 28, establishes a roof for the cage or other space next below it.

Projecting rearwardly of each of the rear uprights 10 is a series of pins 32 each located between the pins 20 and 21 at the top and bottom, respectively, of each cage and corresponding pins 32 are transversely alined. These pins have annular recesses 33 spaced from the uprights 10, as may best be seen in Fig. 6, and are entrant of vertically disposed keyhole slots 34 in each back wall 35 to enable it to be easily raised and removed from its supporting pins and to be as easily replaced with the recesses 33 enabling the back walls 35 to be maintained in spaced relationship to the uprights 10 and to the proximate cage roof.

At the front of each cage, there is a door 36, conveniently of wire mesh, hinged to one of the front uprights 11 as at 37 and having a hook 38 to lock in the catch 39 on the other upright 11.

Each of the front uprights 11 has a series of vertically spaced pins 40 disposed towards the other and corresponding ones are transversely alined. Each of the pins 21 and 40 has an annular recess 41 (see Figs. 4 and 6), for entry into slots 42 adjacent each end of each of the side walls or panels 43 for each chamber. The slots 42 are keyholes to enable each side wall 43 to be raised and removed from its supporting pins and to be as readily replaced thereon and anchored by the pin recesses 41 which are so spaced as to maintain the side walls in spaced relationship to the inner edges of the proximate uprights.

It will be noted from Figs. 1 and 4 that each side wall 43 has its upper and lower edges approximately parallel to, but spaced from, the proximate members 26. It will also be noted that at each end, each side wall 43 tapers inwardly towards each edge from the zone of its pin receiving slot 42 so that only relatively small zones of contact can exist between each wall and the proximate uprights.

From the foregoing, it will be appreciated that the entire cage may be quickly and easily dismantled for shipment and as readily assembled. This feature is also of particular advantage since it enables the parts of the chambers to be autoclaved.

In practice, cages in accordance with the invention have the further advantage that they may be cleaned with relative ease and convenience. One reason is that each chamber of the cage may be readily flushed to wash the dirt into the subjacent trough which may be exhausted by a vacuum cleaner of the wet pick-up type. Another reason is that the zones of contact between the various parts are so few and so small as to avoid traps where dirt can catch and accumulate. In addition, the wall arrangement of each chamber is effective to reduce, to a satisfactory extent, the transference of dust and hair between cages and the chambers thereof without interference with their ventilation.

What I therefore claim and desire to secure by Letters Patent is:

1. An animal cage comprising a frame including four upright inter-connected corner members, an inclined dropping tray operatively connected to said corner members, a pair of side members having front and rear edge portions connected to respective corner members and having bottom edge portions closely adjacent said tray, a substantially horizontal perforate floor connected to said corner members and overlying said tray, and front and back closure members connected to respective corner members, said sides, front and back being spaced from said floor to provide ready passage for droppings and other material in said cage.

2. The combination recited in claim 1, said front closure being pivotally mounted to one of the upright corner members to provide an access door to the cage.

3. The combination recited in claim 1, said sides and back members detachably connected to the respective corner members by pin and slot connections.

4. The combination recited in claim 1, the inclined dropping tray having a detachable collecting trough connected thereto.

References Cited in the file of this patent

UNITED STATES PATENTS

| | | |
|---|---|---|
| 2,388,157 | Kerr | Oct. 30, 1945 |
| 2,667,143 | Havens | Jan. 26, 1954 |
| 2,697,413 | Tharby | Dec. 21, 1954 |